(12) United States Patent
Gorsuch et al.

(10) Patent No.: US 7,860,182 B2
(45) Date of Patent: Dec. 28, 2010

(54) RECEIVER HARDWARE REDUCTION FOR SPATIALLY INDEPENDENT SIGNALS AND ASSOCIATED METHODS

(75) Inventors: Thomas E. Gorsuch, Merritt Island, FL (US); John E. Hoffmann, Indialantic, FL (US)

(73) Assignee: InterDigital Technology Corporation, Wilmington, DE (US)

(*) Notice: Subject to any disclaimer, the term of this patent is extended or adjusted under 35 U.S.C. 154(b) by 749 days.

(21) Appl. No.: 11/323,944

(22) Filed: Dec. 30, 2005

(65) Prior Publication Data

US 2006/0153319 A1    Jul. 13, 2006

Related U.S. Application Data

(63) Continuation-in-part of application No. 11/232,500, filed on Sep. 22, 2005, now Pat. No. 7,414,579.

(60) Provisional application No. 60/612,546, filed on Sep. 23, 2004, provisional application No. 60/612,435, filed on Sep. 23, 2004, provisional application No. 60/612,433, filed on Sep. 23, 2004, provisional application No. 60/612,550, filed on Sep. 23, 2004, provisional application No. 60/612,632, filed on Sep. 23, 2004, provisional application No. 60/612,548, filed on Sep. 23, 2004, provisional application No. 60/612,471, filed on Sep. 23, 2004, provisional application No. 60/612,551, filed on Sep. 23, 2004, provisional application No. 60/612,469, filed on Sep. 23, 2004, provisional application No. 60/612,547, filed on Sep. 23, 2004, provisional application No. 60/615,338, filed on Oct. 1, 2004, provisional application No. 60/615,260, filed on Oct. 1, 2004, provisional application No. 60/620,775, filed on Oct. 20, 2004, provisional application No. 60/620,776, filed on Oct. 20, 2004, provisional application No. 60/620,862, filed on Oct. 20, 2004, provisional application No. 60/621,113, filed on Oct. 22, 2004, provisional application No. 60/639,223, filed on Dec. 23, 2004.

(51) Int. Cl.
*H04B 7/02* (2006.01)
*H04L 1/02* (2006.01)

(52) U.S. Cl. .................. 375/267; 375/260; 375/296; 375/299; 375/347

(58) Field of Classification Search ............ 375/260, 375/267, 299, 347; 370/296
See application file for complete search history.

(56) References Cited

U.S. PATENT DOCUMENTS 6,473,036 B2    10/2002   Proctor, Jr. ............. 342/372

(Continued)

FOREIGN PATENT DOCUMENTS

GB    2 368 936    5/2002

(Continued)

OTHER PUBLICATIONS

Fredrick et al., A Smart Antenna Receiver Array Using a Single RF Channel and Digital Beamforming, IEEE Transactions on Microwave Theory and Techniques, vol. 50, No. 12, Dec. 2002, pp. 3052-3058.

*Primary Examiner*—Curtis B Odom
(74) *Attorney, Agent, or Firm*—Allen, Dyer, Doppelt, Milbrath & Gilchrist, P.A

(57) ABSTRACT

A communications device includes an antenna array comprising antenna elements for receiving at least N spatially independent signals, and a receiver coupled to the antenna array. The receiver includes an analog receiver circuit for receiving the N spatially independent signals, and has a bandwidth of at least N times an information bandwidth of the spatially independent signals. The receiver further includes a digital receiver circuit coupled to the analog receiver circuit, and samples the N spatially independent signals at a rate of at least N times a Nyquist rate which would have been required if a single antenna element had been used to receive the signals. A processor is coupled to the digital receiver circuit for demultiplexing the sampled N spatially independent signals.

28 Claims, 6 Drawing Sheets

U.S. PATENT DOCUMENTS

| | | | |
|---|---|---|---|
| 6,799,170 B2 | 9/2004 | Lee et al. | 706/20 |
| 6,931,362 B2 | 8/2005 | Beadle et al. | 702/190 |
| 6,996,418 B2 * | 2/2006 | Teo et al. | 455/562.1 |
| 7,099,413 B2 * | 8/2006 | Chuang et al. | 375/347 |
| 2001/0033248 A1 | 10/2001 | Owechko | 342/371 |
| 2002/0021246 A1 | 2/2002 | Martek et al. | 342/373 |
| 2002/0024975 A1 * | 2/2002 | Hendler | 370/535 |
| 2003/0204380 A1 | 10/2003 | Dishman et al. | 702/189 |
| 2004/0078144 A1 | 4/2004 | Cauwenberghs et al. | 702/14 |
| 2004/0252632 A1 * | 12/2004 | Bourdoux et al. | 370/210 |
| 2005/0233717 A1 * | 10/2005 | Iwakuni | 455/133 |

FOREIGN PATENT DOCUMENTS

| | | |
|---|---|---|
| WO | WO2004/049498 | 6/2004 |
| WO | WO2004/055718 | 7/2004 |
| WO | WO2004/088999 | 10/2004 |

* cited by examiner

RECEIVER HARDWARE REDUCTION FOR SPATIALLY INDEPENDENT SIGNALS AND ASSOCIATED METHODS

RELATED APPLICATION

The present application is a continuation-in-part of U.S. patent application Ser. No. 11/232,500 filed Sep. 22, 2005 now U.S. Pat. No. 7,414,579 which claims the benefit of U.S. Provisional Application Ser. Nos. 60/612,546 filed Sep. 23, 2004; 60/612,435 filed Sep. 23, 2004; 60/612,433 filed Sep. 23, 2004; 60/612,550 filed Sep. 23, 2004; 60/612,632 filed Sep. 23, 2004; 60/612,548 filed Sep. 23, 2004; 60/612,471 filed Sep. 23, 2004; 60/612,551 filed Sep. 23, 2004; 60/612,469 filed Sep. 23, 2004; 60/612,547 filed Sep. 23, 2004; 60/615,338 filed Oct. 1, 2004; 60/615,260 filed Oct. 1, 2004; 60/620,775 filed Oct. 20, 2004; 60/620,776 filed Oct. 20, 2004; 60/620,862 filed Oct. 20, 2004; 60/621,113 filed Oct. 22, 2004; and 60/639,223 filed Dec. 23, 2004 the entire contents of which are incorporated herein by reference.

FIELD OF THE INVENTION

The present invention relates to the field of wireless communications, and more particularly, to a receiver operating with a smart antenna.

BACKGROUND OF THE INVENTION

A smart antenna is an array of antenna elements connected to a digital signal processor. Such a configuration dramatically enhances the capacity of a wireless link through a combination of diversity gain, array gain and interference suppression. Increased capacity translates to higher data rates for a given number of users, or more users for a given data rate per user. A smart antenna can also separate signals from multiple users who are separated in space but who use the same radio channel (i.e., center frequency, time-slot, and/or code). This application is known as space-division multiple access (SDMA).

There are still many challenges in the practical implementation of a smart antenna. The digital signal processing is usually performed on the IF or baseband signals. It requires that the signal amplitude and phase information be conveyed properly from the antenna elements to the signal processing stage. In a typical receiver connected to a smart antenna, an independent RF channel is needed for each antenna element. For an N-element antenna array, the total number of RF channels is N.

The cost in terms of hardware and power consumption of such a system is approximately N times those in a single antenna system requiring only a single RF channel. Moreover, antenna arrays with multiple feed lines and complicated RF circuits introduce more circuit noise and are more difficult to integrate into a small area.

Efforts have been made to reduce the repetitive use of RF hardware in a receiver connected to a smart antenna. One approach is to load reactive components to each antenna element to control the individual signal phase before combining. The drawback of this approach is that the signal phase and magnitude information is lost after combining, and advanced vector signal processing capability is not possible.

Another approach reduces the number of RF channels to one using a spatial multiplexing of local elements scheme. This scheme is disclosed in an article titled "A Smart Antenna Receiver Array Using A Single RF Channel And Digital Beamforming" by Fredrick et al., and is based on a signal element of the array being sequentially connected to signal processing circuitry in order to sample the incoming modulated carrier. The sampling rate is higher than the signal bandwidth so that the information of the original signal can be fully restored in post-processing stages using low pass filters.

The communications device 10 disclosed in the Fredrick et al. article is illustrated in FIG. 1, and includes an antenna array 12 comprising N elements 14, a PIN diode multiplexer 16 and a single RF channel. The single RF channel is defined between the PIN diode multiplexer 16 and an analog demultiplexer 18. The RF channel includes a low noise amplifier 20 and a mixer 22. A digital signal processor 24 is connected to the analog demultiplexer 18. The single RF channel advantageously reduces costs in terms of hardware and power consumption.

However, there are N channels of the signal which are sequentially multiplexed to form a single RF output. As FIG. 1 further illustrates, there is a separate circuit for each of the N channels between the analog demultiplexer 18 and the digital signal processor 24. Each separate circuit includes a low pass filter 26 and an analog-to-digital converter 28. These components have an impact on cost and power consumption of the receiver.

SUMMARY OF THE INVENTION

In view of the foregoing background, it is therefore an object of the present invention to further reduce the amount of hardware and power consumption in a receiver operating with a smart antenna.

This and other objects, features, and advantages in accordance with the present invention are provided by a communications device comprising an antenna array comprising a plurality of antenna elements for receiving at least N spatially independent signals, and a receiver coupled to the antenna array. The receiver may comprise an analog receiver circuit and a digital receiver circuit coupled thereto.

The analog receiver circuit may receive the N spatially independent signals, and has a bandwidth of at least N times an information bandwidth of the spatially independent signals. The digital receiver circuit may sample the N spatially independent signals at a rate of at least N times a Nyquist rate which would have been required if a single antenna element had been used to receive the signals. A processor may be coupled to the digital receiver circuit for demultiplexing the sampled N spatially independent signals.

In particular, the digital receiver circuit may comprise a single analog-to-digital converter. The single analog-to-digital converter within the digital receiver circuit results in a reduced number of hardware components for the communications device, which in turn reduces cost and power consumption. Yet another advantage is that the communications device may be made more compact, particular for hand-held devices, such as cellular telephones.

The processor may demodulate in parallel the N spatially independent signals after having been demultiplexed, with the N demodulated signals then being combined for signal processing. The processor may then reconstruct the N independently transmitted signals.

The plurality of antenna elements may comprise N uncorrelated antenna elements. In another embodiment, the plurality of antenna elements may comprise N correlated antenna elements. The N correlated antenna elements may comprise N active antenna elements so that the antenna array forms a phased array. Alternatively, the N correlated antenna elements may comprise at least one active antenna element, and up to N−1 passive antenna elements so that the antenna array forms a switched beam antenna.

The signal processing may be based upon at least one of a knowledge based signal extraction process and a blind signal separation process. The N spatially independent signals may correspond to a single transmitted signal. Alternatively, the N spatially independent signals may correspond to N independently transmitted signals from a MIMO transmitter, and wherein the processor reconstructs the N independently transmitted signals.

The communications device may further comprise a transmitter, and a switch coupled between the antenna array, the transmitter and the receiver so that the communications device operates in a half-duplex mode. In another embodiment, instead of the switch, at least one additional antenna element is dedicated to the transmitter so that the communications device operates in a full-duplex mode.

Another aspect if the invention is directed to a method for operating a communications device as defined above.

DETAILED DESCRIPTION OF THE PREFERRED EMBODIMENTS

Figure 1:
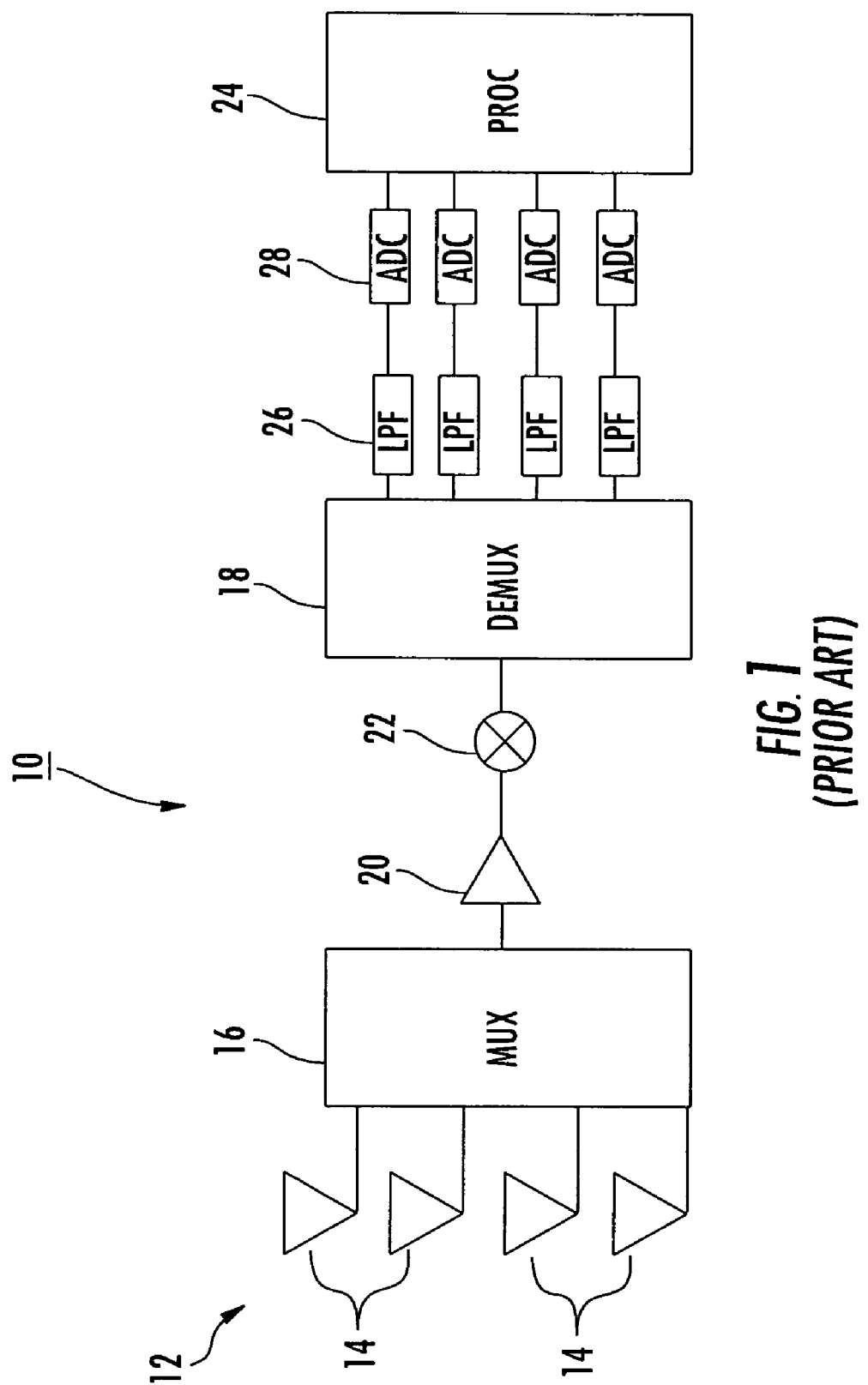
FIG. 1 is a block diagram of a receiver connected to a smart antenna in accordance with the prior art.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIGS. 2-5, a communications device 40 in accordance with the invention will now be discussed. The illustrated communications device 40 is configured as a half-duplex communications device, and comprises an antenna array 42, a receiver 44, a transmitter 46 and a processor 48 connected to the receiver and transmitter.

The antenna array 42 comprises a plurality of antenna elements 52 for receiving at least N spatially independent signals. The receiver 44 is coupled to the antenna array 42, and comprises an analog receiver circuit 64 and a digital receiver circuit 74.

The analog receiver circuit 64 receives the N spatially independent signals, and has a bandwidth of at least N times an information bandwidth of the spatially independent signals. The digital receiver circuit 74 samples the N spatially independent signals at a rate of at least N times the Nyquist rate which would have been required if a single antenna element had been used to receive the signals. The Nyquist rate is defined as 2 times the information bandwidth of the independent signals.

The processor 48 is coupled to the digital receiver circuit 74 for demultiplexing the sampled N spatially independent signals. The processor 48 demodulates in parallel the N spatially independent signals after having been demultiplexed, with the N demodulated signals then being combined with signal processing.

As will be discussed in greater detail below, the digital receiver circuit 74 comprises only one analog-to-digital converter 77. Instead of a separate analog-to-digital converter for each spatially independent signal, the illustrated analog-to-digital converter 77 has a fast enough sampling rate so that the same analog-to-digital converter is used on the received N spatially independent signals. Analog-to-digital converters that are readily available are typically capable of sampling at rates much higher than the Nyquist rate for signals of interest.

Implementation of a single analog-to-digital converter 77 within the receiver 44 results in a reduced number of hardware components for the communications device 40, which in turn reduces cost and power consumption. Yet another advantage is that the communications device 40 may be made more compact, particular for hand-held devices, such as cellular telephones.

The illustrated antenna array 42 comprises 3 correlated antenna elements 52, with at least one of the correlated antenna elements being an active antenna element 52(1), and the other 2 antenna elements being passive antenna elements 52(2) so that the antenna array forms a switched beam antenna. For a 3 element switched beam antenna, 4 different antenna patterns may be generated for receiving up to 4 spatially independent signals, i.e., N=4. The 3 element antenna array 42 is for illustrative purposes only, and may include a different number of antenna elements for receiving a different number of spatially independent signals.

Figure 3:
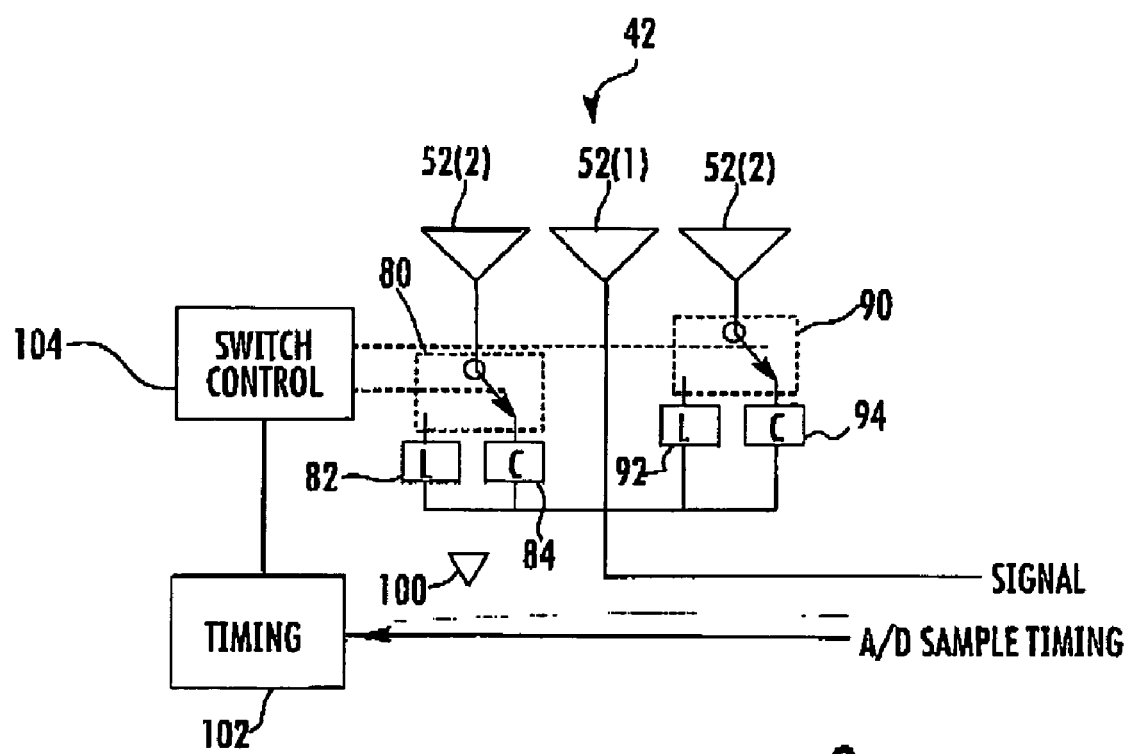
FIG. 3 is a more detailed block diagram of the antenna array and controller illustrated in FIG. 2.

The antenna array 42 is illustrated in greater detail in FIG. 3. The antenna array 42 has fast antenna mode switching, and includes left and right passive antenna elements 52(2). One of the passive antenna elements 52(1) can be independently connected through a switch 80 to inductive 82 or capacitive 84 impedances. Likewise, the other passive antenna element 52(2) can be independently connected through a switch 90 to inductive 92 or capacitive 94 impedances.

The inductive and capacitive impedances 82, 84 and 92, 94 are tuned such that the left and right passive antenna elements 52(2) appear at the receive frequency of interest as shorted to circuit ground 100 or as an open circuit. The spacing of the elements is such that a grounded parallel element acts as a reflector for the incoming signals of interest.

A timing circuit 102 for a switch controller 104 is coordinated with the analog-to-digital sampling of the receiver 44. The timing circuit 102 and the switch controller 104 are part of the controller 106 illustrated in FIG. 1. Given a center antenna element 52(1) and two parasitic antenna elements 52(2) with two circuit switched impedances, four distinct modes can be created as discussed above for four distinct gain patterns. Using commonly available switches such as pin diodes, the antenna mode can be switched in less than 50 nsec.

Figure 2:
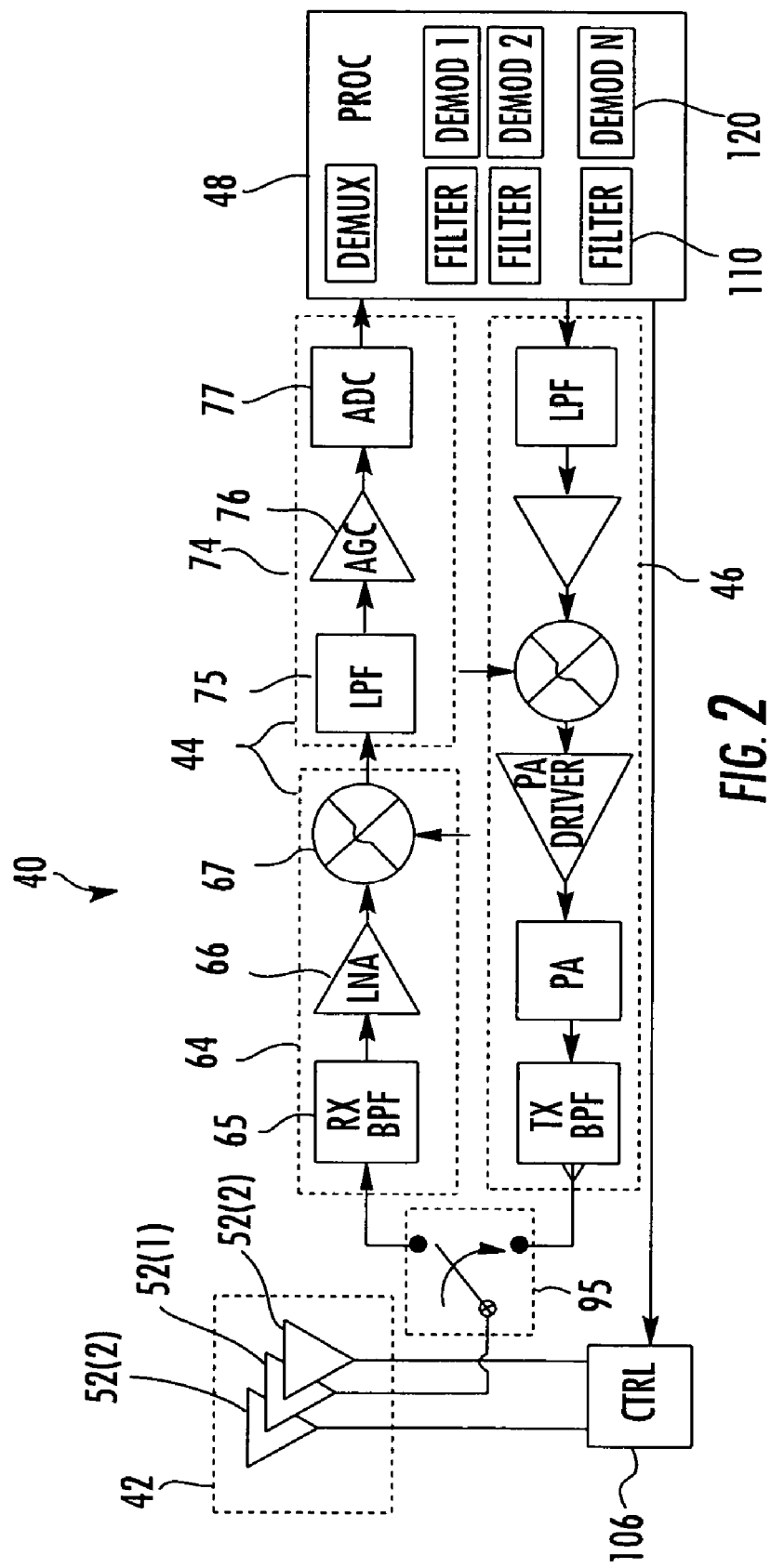
FIG. 2 is a block diagram of a half-duplex communications device in accordance with the present invention.

Still referring to FIG. 2, the collection of the N-spatially independent signals by the antenna array 42 is time varying in that each mode or element is switch connected to the rest of the analog receiver circuit 64 through the switch controller 104. The time for switching between antenna modes is a fraction of the time between samples.

The analog receiver circuit 64 has a minimum bandwidth of N times the information bandwidth where N equals the number of spatially independent signals to be sampled. The analog receiver circuit 64 includes a bandpass filter 65, a low noise amplifier 66, and a down-converter 67 for converting the composite N spatially independent signals to a composite baseband signal.

The digital receiver circuit 74 samples at a rate of at least N times the Nyquist rate which would have been required if a single antenna had been employed. The illustrated digital circuit includes a low pass filter 75, and an automatic gain control (AGC) 76 which has 1/N times the minimum settling time as would have been required with a single, non-switched antenna mode.

As discussed above, the digital receiver circuit 74 comprises an analog-to-digital converter 77 that samples the N spatially independent signals at a rate of at least N times the Nyquist rate which would have been required if a single antenna element had been used to receive the signals. Instead of a separate low pass filter 75, AGC 76 and analog-to-digital converter 77 for each spatially independent signal, the illustrated analog-to-digital converter has a fast enough sampling rate so that the same analog-to-digital converter is used.

The processor 48, also referred to as a digital baseband processor, is used to demultiplex the samples according to the antenna mode switching sequence and to send each respective series of samples to an independent low pass filter 110 and demodulator 120. The filtering and demodulating functions are performed in software within the processor 48. The processor 48 demodulates in parallel the N spatially independent signals after having been demultiplexed, with the N demodulated signals then being combined for signal processing. The signal processing may be based on a knowledge based signal extraction process or a blind signal separation process, for example.

The blind signal separation process is based on at least one of principal component analysis (PCA), independent component analysis (ICA) and single value decomposition (SVD). The knowledge based signal separation process is based on at least one of a zero forcing (ZF) process and a minimum mean squared estimation (MMSE) process. Other known signal processing techniques include max ratio combining or equal gain combining.

If the N spatially independent signals correspond to N independently transmitted signals from a MIMO transmitter, then the processor reconstructs the N independently transmitted signals. Alternatively, the N spatially independent signals correspond to a single transmitted signal.

To transmit from the communications device 40, the transmitter 46 is switched to the antenna array 42 using a switch 95 during time intervals when the receiver 44 is not scheduled for receiving. This half duplex implementation for receiving and transmitting at discrete independent times may be used for systems such as WLAN, GSM, UMTS-TDD and 802.16 among others.

Figure 4:
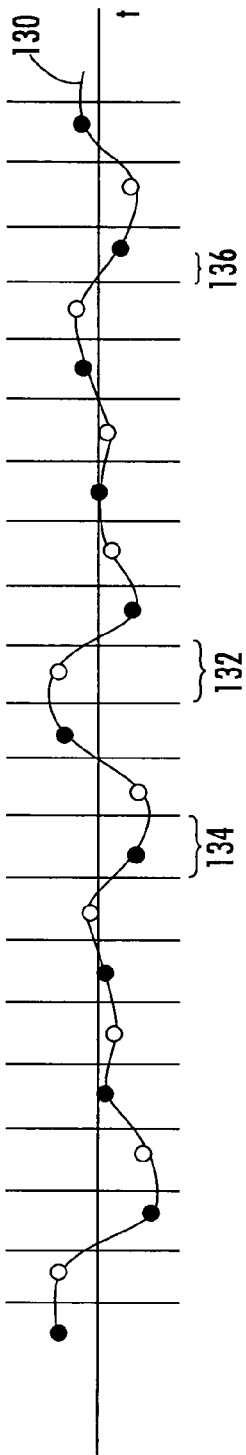
FIG. 4 is a plot of a composite signal made up of two spatially independent signals after having been sampled in accordance with the present invention.
Figure 5:
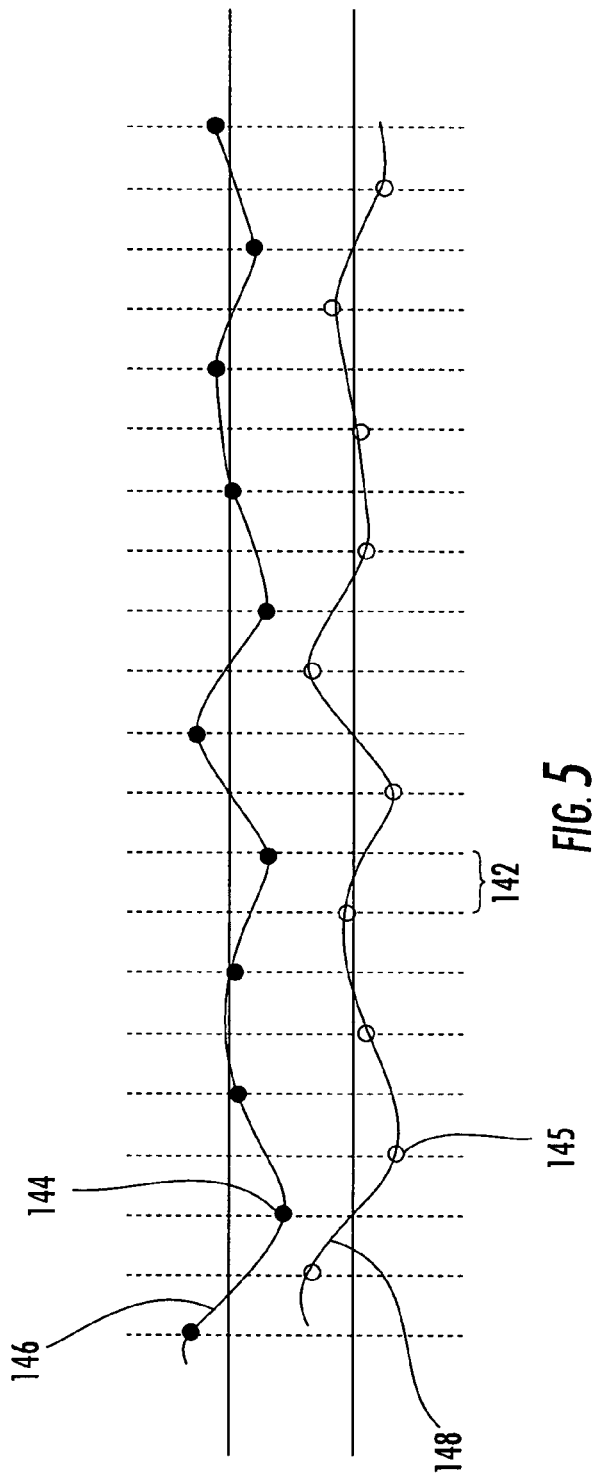
FIG. 5 is a plot of the composite signal illustrated in FIG. 4 after having been demultiplexed.

For purposes of illustrating the present invention, a plot of a composite signal 130 made up of two spatially independent signals after having been sampled will be discussed in reference to FIG. 4, and a plot of the composite signal after having been demultplexed will be discussed in reference to FIG. 5.

The composite signal 130 has twice the bandwidth of either of the 2 input signals. The antenna switching interval 132 is synchronized to the digitizer sampling interval 142 but offset from sampling to allow for circuit settling time.

The antenna switching start 134 begins as soon as possible following completion of the digital sample. The digital sample can begin as soon as the antenna switching has settled through the receiver 44. This switching time 136 should be a fraction of the time between samples. The sampling rate of the digitizer, one over the interval between signal one sample 144 and signal two sample 145, is twice that which would be required with only one antenna mode. The two separate signals 146 and 148 as reconstructed following baseband processor demultiplexing and low pass filtering.

Figure 6:
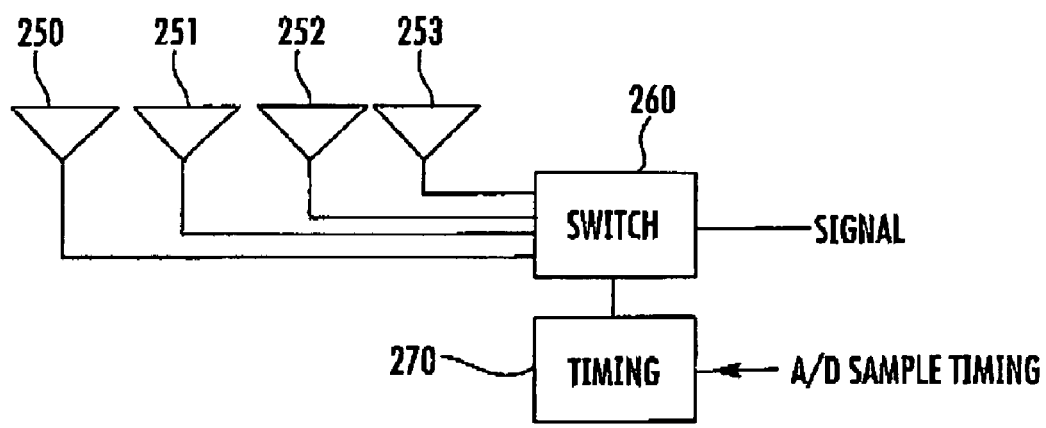
FIG. 6 is another embodiment of the antenna array and controller illustrated in FIG. 2.
Figure 7:
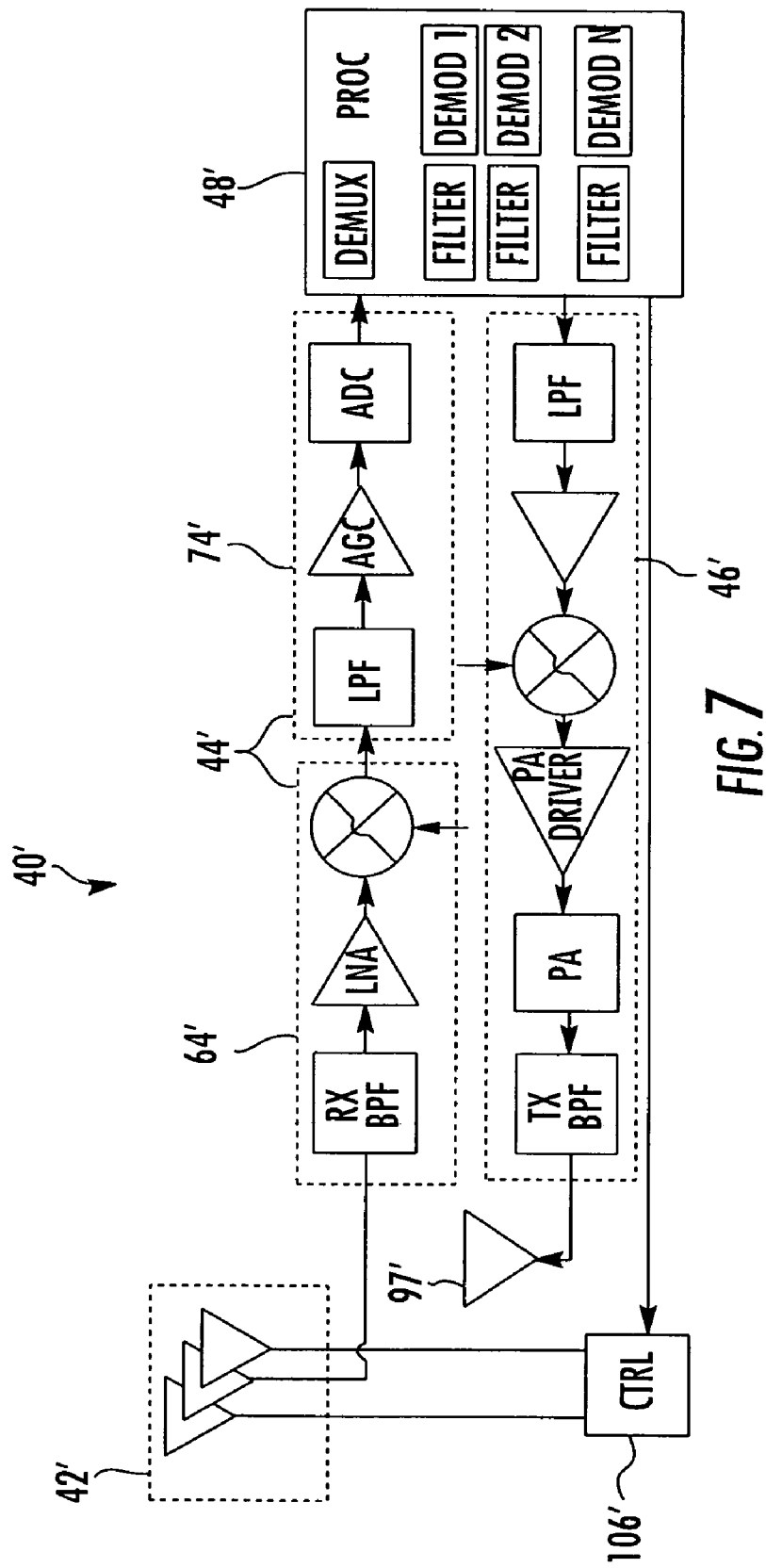
FIG. 7 is a block diagram of a full-duplex communications device in accordance with the present invention.

FIG. 6 is another embodiment of the antenna array and controller illustrated in FIG. 2. The illustrated antenna array comprises N uncorrelated antenna elements, with N being equal to 4. Each antenna element 250, 251, 252 and 253 is tuned for receiving at the modulation frequency for the signal of interest. A switch matrix 260 includes an RF switch per antenna element that can be closed to connect that element to the receiver 44, or open to disconnect that element. One antenna element at a time is connected to the receiver 44. Timing 270 for the RF switch matrix is coordinated with the analog-to-digital sampling of the receiver 44. The switch matrix 260 is designed such that the switching time is a fraction of the sampling interval. Also, the impedance of each switched in element circuit is closely matched to the input impedance of the analog receiver circuit 64.

The communications device may also be implemented as a full-duplex communications device 40'. In this configuration, the antenna array 42', the analog receiver circuit 64', the digital receiver circuit 74', the baseband processor 48', and the transmitter 46' operate the same as in FIG. 2 and as described above. In the full duplex operation, there is a separate transmit antenna 97' that allows continuous transmission even while the receive antenna array 42' is switching between modes.

The antenna controller 106' runs continuously for received signal sampling without the need to accommodate the transmit interval as is required in the half-duplex antenna controller 106. This full duplex implementation for receiving and transmitting continuously may be used for systems such as CDMA2000, UMTS-FDD and 802.20 among others.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device comprising:
   an antenna array comprising a plurality of antenna elements for receiving at least N spatially independent signals;
   a receiver coupled to said antenna array and comprising
      an analog receiver circuit for receiving the N spatially independent signals, and having a bandwidth of at least N times an information bandwidth of the spatially independent signals, and
      a digital receiver circuit coupled to said analog receiver circuit, and sampling the N spatially independent signals at a rate of at least N times a Nyquist rate which would have been required if a single antenna element had been used to receive the signals, and comprising an analog-to-digital converter for converting the N spatially independent signals to N spatially independent digital signals;
   a controller coupled to said antenna array and comprising
      a switching circuit coupled to said antenna array for switching between said plurality of antenna elements for sampling the N spatially independent signals by said antenna array, and a timing circuit coupled to said switching circuit for coordinating sampling of the N spatially independent signals by said antenna array based on sample timing of the N spatially independent digital signals by said analog-to-digital converter; and a processor coupled to said digital receiver circuit for demultiplexing the sampled N spatially independent digital signals, and coupled to said timing circuit for providing the sample timing of the N spatially independent digital signals by said analog-to-digital converter.

2. A communications device according to claim 1 wherein said digital receiver circuit comprises a single analog-to-digital converter.

3. A communications device according to claim 1 wherein said processor demodulates in parallel the N spatially independent signals after having been demultiplexed, with the N demodulated signals then being combined for signal processing.

4. A communications device according to claim 1 wherein said processor reconstructs the N independently transmitted signals.

5. A communications device according to claim 1 wherein said plurality of antenna elements comprise N uncorrelated antenna elements.

6. A communications device according to claim 1 wherein said plurality of antenna elements comprise N correlated antenna elements.

7. A communications device according to claim 6 wherein said N correlated antenna elements comprise N active antenna elements so that said antenna array forms a phased array.

8. A communications device according to claim 6 wherein said N correlated antenna elements comprise at least one active antenna element, and up to N−1 passive antenna elements so that said antenna array forms a switched beam antenna.

9. A communications device according to claim 3 wherein the signal processing is based upon at least one of a knowledge based signal extraction process and a blind signal separation process.

10. A communications device according to claim 9 wherein the blind signal separation process is based on at least one of principal component analysis (PCA), independent component analysis (ICA) and single value decomposition (SVD).

11. A communications device according to claim 9 wherein the knowledge based signal separation process is based on at least one of a zero forcing (2F) process and a minimum mean squared estimation (MMSE) process.

12. A communications device according to claim 1 wherein the N spatially independent signals correspond to a single transmitted signal.

13. A communications device according to claim 1 wherein the N spatially independent signals correspond to N independently transmitted signals from a MIMO transmitter; and wherein said processor reconstructs the N independently transmitted signals.

14. A communications device according to claim 1 further comprising:

a transmitter; and a switch coupled between said antenna array, said transmitter and said receiver so that the communications device operates in a half-duplex mode.

15. A communications device according to claim 1 further comprising:

a transmitter; and at least one additional antenna element dedicated to said transmitter so that the communications device operates in a full-duplex mode.

16. A method for operating a communications device comprising an antenna array comprising a plurality of antenna elements, an analog receiver circuit coupled to the antenna array, a digital receiver circuit coupled to the analog receiver circuit comprising an analog-to-digital converter, a processor coupled to the digital receiver circuit, and a controller coupled to the antenna array and comprising a switching circuit coupled to the antenna array and a timing circuit coupled to the processor, the method comprising:

receiving at least N spatially independent signals by the antenna array;

providing the N spatially independent signals to analog receiver circuit, the analog receiver circuit having a bandwidth of at least N times an information bandwidth of the spatially independent signals;

sampling in the digital receiver circuit the N spatially independent signals at a rate of at least N times a Nyquist rate which would have been required if a single antenna element had been used to receive the signals;

converting in the analog-to-digital converter the sampled N spatially independent signals to N spatially independent digital signals;

operating the switch controller for causing the switching circuit coupled to the antenna array to switch the plurality of antenna elements for sampling the N spatially independent signals by the antenna array based on operation of the switching circuit, and causing the timing circuit coupled to the switching circuit to sample the N spatially independent signals by the antenna array based on a sample timing of the N spatially independent digital signals by the analog-to-digital converter; and demultiplexing the sampled N spatially independent digital signals in the processor, and providing from the processor to the timing circuit the sample timing of the N spatially independent digital signals by the analog-to-digital converter.

17. A method according to claim 16 wherein the digital receiver circuit comprises a single analog-to-digital converter.

18. A method according to claim 16 wherein the processor demodulates in parallel the N spatially independent signals after having been demultiplexed, with the N demodulated signals then being combined for signal processing.

19. A method according to claim 16 wherein the processor reconstructs the N independently transmitted signals.

20. A method according to claim 16 wherein the plurality of antenna elements comprise N uncorrelated antenna elements.

21. A method according to claim 16 wherein the plurality of antenna elements comprise N correlated antenna elements.

22. A method according to claim 21 wherein the N correlated antenna elements comprise N active antenna elements so that the antenna array forms a phased array.

23. A method according to claim 21 wherein the N correlated antenna elements comprise at least one active antenna element, and up to N−1 passive antenna elements so that the antenna array forms a switched beam antenna.

24. A method according to claim 18 wherein the signal processing is based upon at least one of a knowledge based signal extraction process and a blind signal separation process.

25. A method according to claim 16 wherein the N spatially independent signals correspond to a single transmitted signal.

26. A method according to claim 16 wherein the N spatially independent signals correspond to N independently transmitted signals from a MIMO transmitter; and wherein the processor reconstructs the N independently transmitted signals.

27. A method according to claim 16 wherein the communications device further comprises a transmitter, and a switch coupled between the antenna array, the transmitter and the receiver so that the communications device operates in a half-duplex mode.

28. A method according to claim 16 wherein the communications device further comprises a transmitter, and at least one additional antenna element dedicated to the transmitter so that the communications device operates in a full-duplex mode.

* * * * *